(12) United States Patent
Furuhashi (10) Patent No.: US 11,810,719 B2
(45) Date of Patent: Nov. 7, 2023

(54) FILM CAPACITOR AND DIELECTRIC RESIN FILM FOR FILM CAPACITOR

(71) Applicant: Murata Manufacturing Co., Ltd., Nagaokakyo (JP)

(72) Inventor: Takumi Furuhashi, Nagaokakyo (JP)

(73) Assignee: MURATA MANUFACTURING CO., LTD., Nagaokakyo (JP)

( * ) Notice: Subject to any disclaimer, the term of this patent is extended or adjusted under 35 U.S.C. 154(b) by 172 days.

(21) Appl. No.: 17/398,205

(22) Filed: Aug. 10, 2021

(65) Prior Publication Data

US 2021/0366656 A1 Nov. 25, 2021

Related U.S. Application Data

(63) Continuation of application No. PCT/JP2020/003780, filed on Jan. 31, 2020.

(30) Foreign Application Priority Data

Feb. 15, 2019 (JP) .................................. 2019-025530

(51) Int. Cl.
*H01G 4/14* (2006.01)
*H01G 4/008* (2006.01)
*H01G 4/32* (2006.01)

(52) U.S. Cl.
CPC ............. *H01G 4/145* (2013.01); *H01G 4/008* (2013.01); *H01G 4/32* (2013.01)

(58) Field of Classification Search
CPC .......... H01G 4/008; H01G 4/145; H01G 4/18; H01G 4/32
See application file for complete search history.

(56) References Cited

U.S. PATENT DOCUMENTS

| 2014/0368970 | A1* | 12/2014 | Ichikawa | ........... C08G 18/6212 525/534 |
| 2019/0067680 | A1* | 2/2019 | Ohsawa | .................. H01M 4/66 |
| 2019/0153217 | A1* | 5/2019 | Mahood | .................. C08L 69/00 |
| 2019/0348220 | A1* | 11/2019 | Ichikawa | ............... H01G 4/012 |

FOREIGN PATENT DOCUMENTS

| JP | 2015181199 A | 10/2015 |
| WO | 2017196922 A1 | 11/2017 |
| WO | 2018142922 A1 | 8/2018 |

OTHER PUBLICATIONS

Written Opinion of the International Searching Authority issued for PCT/JP2020/003780, dated Mar. 3, 2020.
International Search Report issued for PCT/JP2020/003780, dated Mar. 3, 2020.

* cited by examiner

*Primary Examiner* — Nathan Milakovich
(74) *Attorney, Agent, or Firm* — ArentFox Schiff LLP (57) ABSTRACT

A film capacitor that includes: a dielectric resin film; and a metal layer on at least one surface of the dielectric resin film. The dielectric resin film contains at least one skeleton selected from the group consisting of a biphenyl skeleton, a bisphenol acetophenone skeleton, a bisphenol fluorene skeleton, a bisphenol S skeleton, a bisphenol cyclohexanone skeleton, and an epoxy-modified bisphenol A skeleton.

24 Claims, 7 Drawing Sheets

FILM CAPACITOR AND DIELECTRIC RESIN FILM FOR FILM CAPACITOR

CROSS REFERENCE TO RELATED APPLICATIONS

The present application is a continuation of International application No. PCT/JP2020/003780, filed Jan. 31, 2020, which claims priority to Japanese Patent Application No. 2019-025530, filed Feb. 15, 2019, the entire contents of each of which are incorporated herein by reference.

FIELD OF THE INVENTION

The present invention relates to a film capacitor and a dielectric resin film for film capacitors.

BACKGROUND OF THE INVENTION

As a kind of capacitor, a film capacitor is known and has a structure in which a first counter electrode and a second counter electrode are disposed to face each other in a state where a flexible resin film used as a dielectric is sandwiched between the counter electrodes. The film capacitor usually has a substantially cylindrical shape formed by winding a resin film as a dielectric, and first and second external terminal electrodes are respectively formed on first and second end faces of the cylinder facing each other. The first counter electrode is electrically connected to the first external terminal electrode, and the second counter electrode is electrically connected to the second external terminal electrode.

For example, Patent Document 1 describes a film capacitor that includes a dielectric resin film and first and second counter electrodes facing each other with the dielectric resin film interposed therebetween. In the film capacitor described in Patent Document 1, the dielectric resin film is a cured product obtained by reacting at least two kinds of organic materials including first and second organic materials, and is composed of a dielectric resin composition that contains a first atomic group selected from a methylene group ($CH_2$ group), an aromatic ring, and an ether group (—O— group) and containing at least one functional group having a relatively small molar polarizability, and a second atomic group selected from a hydroxyl group (OH group), an amino group (NH group), and a carbonyl group (C=O group) and containing at least one functional group having a relatively high molar polarizability. A value represented by the formula: (total absorption band strength of first atomic group)/(total absorption band strength of second atomic group) is 1.0 or more.

Patent Document 1: Japanese Patent Application Laid-Open No. 2015-181199

SUMMARY OF THE INVENTION

In recent years, frequencies of electronic devices have increased, and accordingly, better high frequency characteristics of electronic components are increasingly required. A major problem in a capacitor is a dielectric loss tangent (tan δ) at high frequency. The dielectric loss tangent is preferably as low as possible, and is ideally zero. A high value thereof causes energy loss and heat generation associated therewith, resulting in problems such as unstable operation of a high frequency circuit and a shortened life of an electronic component.

Patent Document 1 states that the film capacitor described therein makes it possible to make a dielectric loss tangent (also called a loss coefficient) at 125° C. as low as, for example, 0.6% or less. Patent Document 1 states that, preferably, a phenoxy resin and an isocyanate compound are respectively used as the first organic material and the second organic material. In Examples, a thermosetting resin film is formed by combining an isocyanate compound such as tolylene diisocyanate (TDI) or diphenylmethane diisocyanate (MDI) with a phenoxy resin that is a high-molecular-weight bisphenol A type epoxy resin having an epoxy group at its terminal.

The ambient temperature at which the film capacitor is used may widely vary. For example, when a film capacitor designed to have heat resistance at 125° C. is used at a high temperature, and a large current flows, equivalent series resistance (ESR) increases if the loss coefficient of the film capacitor is high, so that self-heating in the capacitor causes a temperature increase in the capacitor itself. That is, the self-heating of the capacitor is added to heating due to an environmental temperature applied to the film capacitor, resulting in an unexpected temperature increase. Therefore, the film capacitor is required not only to have a low loss coefficient at 125° C., but also to have a low loss coefficient at a higher temperature.

The present invention has been made to solve the above problems, and an object of the present invention is to provide a film capacitor having a low loss coefficient at a temperature higher than 125° C. Another object of the present invention is to provide a dielectric resin film for the film capacitor.

A film capacitor of the present invention is, in a first aspect, a film capacitor including: a dielectric resin film; and a metal layer on at least one surface of the dielectric resin film, wherein the dielectric resin film contains at least one skeleton selected from the group consisting of a biphenyl skeleton, a bisphenol acetophenone skeleton, a bisphenol fluorene skeleton, a bisphenol S skeleton, a bisphenol cyclohexanone skeleton, and an epoxy-modified bisphenol A skeleton.

A film capacitor of the present invention is, in a second aspect, a film capacitor including: a dielectric resin film; and a metal layer on at least one surface of the dielectric resin film, wherein the dielectric resin film has a skeleton that is more rigid than a skeleton represented by the following formula (A):

(A)

A film capacitor of the present invention is, in a third aspect, a film capacitor including: a dielectric resin film; and a metal layer on at least one surface of the dielectric resin film, wherein: the dielectric resin film contains a cured resin obtained from a first organic material and a second organic material as a main component of the cured resin; and the first organic material is a phenoxy resin containing a first phenoxy resin having a glass transition temperature Tg higher than 87° C.

A dielectric resin film for film capacitors of the present invention, in a first aspect, contains at least one skeleton selected from the group consisting of a biphenyl skeleton, a bisphenol acetophenone skeleton, a bisphenol fluorene skeleton, a bisphenol S skeleton, a bisphenol cyclohexanone skeleton, and an epoxy-modified bisphenol A skeleton.

A dielectric resin film for film capacitors of the present invention, in a second aspect, contains a skeleton that is more rigid than a skeleton represented by the following formula (A):

(A)

A dielectric resin film for film capacitors of the present invention, in a third aspect, contains a cured resin obtained from a first organic material and a second organic material as a main component of the cured resin, wherein the first organic material is a phenoxy resin containing a first phenoxy resin having a glass transition temperature Tg higher than 87° C.

The present invention makes it possible to provide a film capacitor in which an increase in loss coefficient is suppressed when the temperature increases to a temperature higher than 125° C.

DETAILED DESCRIPTION OF THE INVENTION

Hereinafter, a film capacitor and a dielectric resin film for film capacitors of the present invention will be described.

However, the present invention is not limited to the following configuration, and may be appropriately modified and applied without departing from the spirit of the present invention.

The present invention also encompasses combinations of two or more of the individual desirable configurations of the present invention described below.

[Film Capacitor]

The film capacitor of the present invention includes a dielectric resin film and a metal layer provided on at least one surface of the dielectric resin film.

Hereinafter, as an embodiment of the film capacitor of the present invention, a wound-type film capacitor obtained by winding a first dielectric resin film including a first metal layer and a second dielectric resin film including a second metal layer in a state where the resin films are laminated will be described as an example.

The film capacitor of the present invention may be a laminated-type film capacitor or the like. The laminated-type film capacitor is obtained by laminating a first dielectric resin film including a first metal layer and a second dielectric resin film including a second metal layer.

Figure 1:
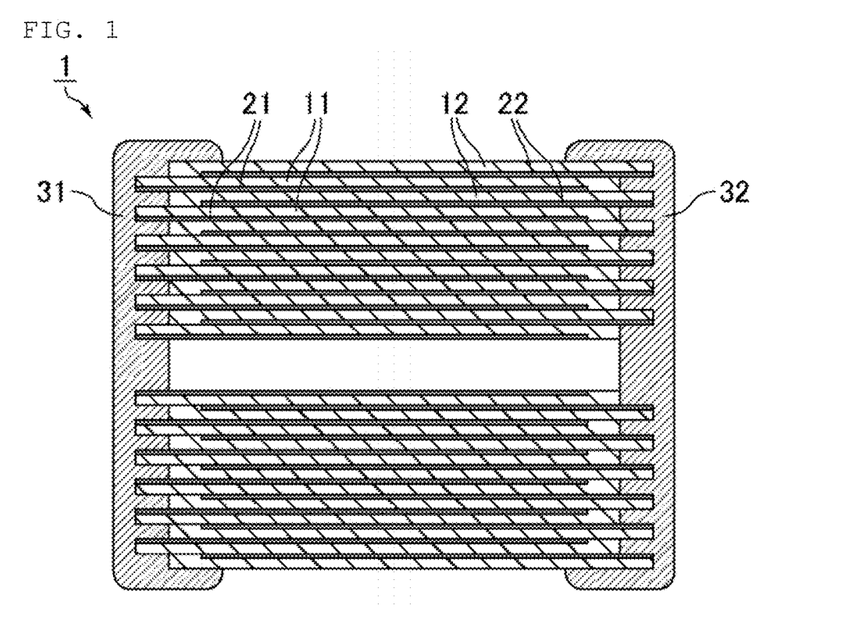
FIG. 1 is a sectional view schematically showing an example of a film capacitor of the present invention.

FIG. 1 is a sectional view schematically showing an example of a film capacitor of the present invention.

A film capacitor 1 shown in FIG. 1 is a wound-type film capacitor. The film capacitor 1 includes a first dielectric resin film 11 and a second dielectric resin film 12 that are in a wound state, a first metal layer (first counter electrode) 21 and a second metal layer (second counter electrode) 22 that face each other with the first dielectric resin film 11 or the second dielectric resin film 12 interposed therebetween, a first external terminal electrode 31 electrically connected to the first metal layer 21, and a second external terminal electrode 32 electrically connected to the second metal layer 22.

The first metal layer 21 is formed on the first dielectric resin film 11, and the second metal layer 22 is formed on the second dielectric resin film 12. The film capacitor 1 is configured such that the first dielectric resin film 11 including the first metal layer 21 and the second dielectric resin film 12 including the second metal layer 22 are wound in a laminated state. The second dielectric resin film 12 may have a structure different from that of the first dielectric resin film 11, but it preferably has the same structure as that of the first dielectric resin film 11.

The first metal layer 21 is formed on one surface of the first dielectric resin film 11 such that the first metal layer 21 reaches one side edge of the first dielectric resin film 11, but does not reach the other side edge thereof. Meanwhile, the second metal layer 22 is formed on one surface of the second dielectric resin film 12 such that the second metal layer 22 does not reach one side edge of the second dielectric resin film 12, but reaches the other side edge thereof. Each of the first metal layer 21 and the second metal layer 22 is composed of, for example, an aluminum layer.

As shown in FIG. 1, the first dielectric resin film 11 and the second dielectric resin film 12 are laminated so as to be offset from each other in the width direction such that an end part of the first metal layer 21 that reaches the side edge of the first dielectric resin film 11 and an end part of the second metal layer 22 that reaches the side edge of the second dielectric resin film 12 are exposed from the laminated films. The first dielectric resin film 11 and the second dielectric resin film 12 are wound in the laminated state, whereby the first metal layer 21 and the second metal layer 22 are stacked in a state of being exposed at the end parts.

In the film capacitor 1 shown in FIG. 1, the first dielectric resin film 11 and the second dielectric resin film 12 are wound such that the second dielectric resin film 12 is located outside the first dielectric resin film 11, and both the first metal layer 21 and the second metal layer 22 face inward.

The first external terminal electrode 31 and the second external terminal electrode 32 are formed by spraying, for example, zinc or the like onto each end face of the body of the capacitor obtained as described above. The first external terminal electrode 31 is in contact with the exposed end part of the first metal layer 21, and is thus electrically connected to the first metal layer 21. Meanwhile, the second external terminal electrode 32 is in contact with the exposed end part of the second metal layer 22, and is thus electrically connected to the second metal layer 22.

In the film capacitor of the present invention, it is preferable that the wound body of the dielectric resin film be pressed into a flat shape having an elliptical or oval cross section, thereby making the wound body more compact than one having a perfect circle cross section. The film capacitor of the present invention may have a cylindrical winding shaft. The winding shaft is disposed on the central axis of the dielectric resin film in the wound state, and serves as a winding shaft for winding the dielectric resin film.

In the film capacitor of the present invention, examples of the metal contained in the metal layer include aluminum (Al), titanium (Ti), zinc (Zn), magnesium (Mg), tin (Sn), and nickel (Ni).

In the film capacitor of the present invention, the thickness of the metal layer is not particularly limited, but it is, for example, 5 nm to 40 nm.

The thickness of the metal layer can be determined by observation of a cross section obtained by cutting the dielectric resin film including the metal layer in the thickness direction, using an electronic microscope such as a field emission scanning electron microscope (FE-SEM).

[Dielectric Resin Film]

It is preferable that the dielectric resin film of the present invention contain a cured resin obtained from a first organic material and a second organic material as a main component of the cured resin, and the first organic material be a phenoxy resin containing a first phenoxy resin having a glass transition temperature Tg higher than 87° C.

The glass transition temperature Tg of a bisphenol A type phenoxy resin used in Examples of Patent Document 1 is about 87° C. In the present invention, by using the phenoxy resin containing the first phenoxy resin having a glass transition temperature Tg higher than 87° C. as the first organic material, a loss coefficient at a temperature higher than 125° C. can be lowered.

The term "main component" used herein means a component present in the largest weight percentage, and preferably means a component present in a weight percentage of more than 50% by weight. Therefore, the dielectric resin film may contain, as a component other than the main component, an additive such as a silicone resin or an uncured portion of starting materials such as a first organic material and a second organic material to be described below.

The cured resin may be a thermosetting resin or a photocurable resin.

The term "thermosetting resin" used herein means a resin that can be cured by heat, and the curing method is not limited. Therefore, a resin cured by a method other than heat (for example, light, an electron beam, or the like) is also included as the thermosetting resin as long as the resin can be cured by heat. Depending on the material, the reaction may be started by the reactivity of the material itself, and resins that are cured without externally applying heat, light, or the like are also used as the thermosetting resin. The same holds true for the photocurable resin, and the curing method is not limited.

The molecular weight of the first organic material is preferably 5,000 or more from the viewpoint of obtaining film strength. The molecular weight of the first organic material is preferably 100,000 or less from the viewpoint of the solubility of the first organic material in a diluted solution.

The molecular weight of the first organic material means a weight average molecular weight (Mw) measured by gel permeation chromatography (GPC) and calculated with reference to a polystyrene standard sample.

The first phenoxy resin is not particularly limited as long as the glass transition temperature Tg of the first phenoxy resin is higher than 87° C., but the glass transition temperature Tg is preferably 90° C. or higher. The first phenoxy resin preferably has a glass transition temperature Tg of 200° C. or lower.

The glass transition temperature Tg of a resin such as the first phenoxy resin is measured with a differential scanning calorimetry (DSC) device. The measurement is performed at a rate of temperature increase of 5° C./min, and a peak top temperature obtained by the time derivative of heat absorption and heat generation temperatures is determined as the glass transition temperature Tg.

The first phenoxy resin preferably has a skeleton that is more rigid than a skeleton represented by the following formula (A):

(A)

The bisphenol A type phenoxy resin used in Examples of Patent Document 1 mainly has the skeleton represented by the above formula (A). In the present invention, by using the phenoxy resin having a skeleton that is more rigid than the skeleton represented by the above formula (A) as the first phenoxy resin, a loss coefficient at a temperature higher than 125° C. can be lowered.

The skeleton represented by the above formula (A) includes a bisphenol A skeleton represented by the following formula (a) and a —CH$_2$—CH(OH)—CH$_2$— skeleton. As used herein, the skeleton that is more rigid than the skeleton represented by the above formula (A) means a skeleton having a structure that is more rigid than that of at least one of the bisphenol A skeleton and the —CH$_2$—CH(OH)—CH$_2$— skeleton.

(a)

The first phenoxy resin preferably contains at least one skeleton selected from the group consisting of a biphenyl skeleton, a bisphenol acetophenone skeleton, a bisphenol fluorene skeleton, a bisphenol S skeleton, a bisphenol cyclohexanone skeleton, and an epoxy-modified bisphenol A skeleton.

Of these, the biphenyl skeleton, the bisphenol acetophenone skeleton, the bisphenol fluorene skeleton, the bisphenol S skeleton, and the bisphenol cyclohexanone skeleton have a structure that is more rigid than that of the bisphenol A skeleton, and the epoxy-modified bisphenol A skeleton has a structure that is more rigid than that of the —CH$_2$—CH(OH)—CH$_2$— skeleton.

Examples of the biphenyl skeleton include a skeleton represented by the following formula (1):

(1)

In the above formula (1), the biphenyl skeleton has four methyl groups, but the biphenyl skeleton may have at least one alkyl group or other substituent, or may have no alkyl group or other substituent.

Examples of the bisphenol acetophenone skeleton include a skeleton represented by the following formula (2):

(2)

Examples of the bisphenol fluorene skeleton include a skeleton represented by the following formula (3):

(3)

Examples of the bisphenol S skeleton include a skeleton represented by the following formula (4):

(4)

Examples of the bisphenol cyclohexanone skeleton include a skeleton represented by the following formula (5):

(5)

In the above formula (5), the bisphenol cyclohexanone skeleton has three methyl groups, but the bisphenol cyclohexanone skeleton may have at least one methyl group, or may have no methyl group.

Examples of the epoxy-modified bisphenol A skeleton include a skeleton represented by the following formula (6):

(6)

The structure of an epoxy-modified group is not particularly limited as long as the epoxy-modified bisphenol A skeleton is a skeleton in which a hydrogen of a secondary carbon of the skeleton represented by the above formula (A) is substituted with the epoxy-modified group.

Specifically, the first phenoxy resin is preferably any one phenoxy resin selected from the group consisting of a biphenyl-bisphenol acetophenone copolymerized phenoxy resin, a bisphenol A-bisphenol fluorene copolymerized phenoxy resin, a bisphenol S-bisphenol A copolymerized phenoxy resin, a bisphenol A-bisphenol TMC copolymerized phenoxy resin, a biphenyl-bisphenol TMC copolymerized phenoxy resin, a biphenyl-bisphenol fluorene copolymerized phenoxy resin, and an epoxy-modified bisphenol A-bisphenol A copolymerized phenoxy resin.

The first organic material preferably contains the first phenoxy resin in an amount of 12.5 mol % or more with respect to the dielectric resin film. In particular, the first organic material preferably contains a skeleton that is more rigid than the skeleton represented by the above formula (A) in an amount of 12.5 mol % or more with respect to the dielectric resin film. For example, the first organic material preferably contains any one skeleton selected from the group consisting of a biphenyl skeleton, a bisphenol acetophenone skeleton, a bisphenol fluorene skeleton, a bisphenol S skeleton, a bisphenol cyclohexanone skeleton, and an epoxy-modified bisphenol A skeleton in an amount of 12.5 mol % or more with respect to the dielectric resin film.

If the skeleton that is more rigid than the skeleton of the phenoxy resin used in Examples of Patent Document 1 is contained in an amount of 12.5 mol % or more with respect to the dielectric resin film, a loss coefficient at a temperature higher than 125° C. can be lowered.

It is preferable that when two or more of the above skeletons are contained in the first organic material, each skeleton be contained in an amount of 12.5 mol % or more with respect to the dielectric resin film.

In addition, the first phenoxy resin may contain a rigid skeleton such as a bisphenol BP skeleton, a bisphenol B skeleton, a bisphenol C skeleton, a bisphenol G skeleton, a bisphenol PH skeleton, a bisphenol Z skeleton, a dihydroxynaphthalene skeleton, a dihydroxyanthracene skeleton, or a reduced dihydroxyanthracene skeleton. Only one of these skeletons may be used, or two or more thereof may be used. The skeletons may be combined with the above-mentioned biphenyl skeleton, bisphenol acetophenone skeleton, bisphenol fluorene skeleton, bisphenol S skeleton, and bisphenol cyclohexanone skeleton.

When the first phenoxy resin contains these skeletons in place of the bisphenol A skeleton represented by the above formula (a), a hydrogen of a secondary carbon may be substituted with an epoxy-modified group.

Examples of the bisphenol BP skeleton include a skeleton represented by the following formula (7):

(7)

Examples of the bisphenol B skeleton include a skeleton represented by the following formula (8):

(8)

Examples of the bisphenol C skeleton include a skeleton represented by the following formula (9):

(9)

Examples of the bisphenol G skeleton include a skeleton represented by the following formula (10):

(10)

Examples of the bisphenol PH skeleton include a skeleton represented by the following formula (11):

(11)

Examples of the bisphenol Z skeleton include a skeleton represented by the following formula (12):

(12)

Examples of the dihydroxynaphthalene skeleton include a skeleton represented by the following formula (13):

(13)

Examples of the dihydroxyanthracene skeleton include a skeleton represented by the following formula (14)

(14)

Examples of the reduced dihydroxyanthracene skeleton include a skeleton represented by the following formula (15):

(15)

As the first organic material, two or more organic materials may be used in combination. The first organic material may contain only the first phenoxy resin having a glass transition temperature Tg higher than 87° C. as the phenoxy resin, but it may also contain a second phenoxy resin having a glass transition temperature Tg of 87° C. or lower.

The second organic material is preferably an isocyanate compound, an epoxy resin, or a melamine resin. As the second organic material, two or more organic materials may be used in combination. Among the second organic materials, an isocyanate compound is preferable.

Examples of the isocyanate compound include aromatic polyisocyanates such as diphenylmethane diisocyanate (MDI) and tolylene diisocyanate (TDI) and aliphatic polyisocyanates such as hexamethylene diisocyanate (HDI). Modified products of these polyisocyanates, for example, modified products having carbodiimide, urethane, or the like may be used. Among them, the aromatic polyisocyanates are preferable, and any one of MDI and TDI is more preferable.

The epoxy resin is not particularly limited as long as it is a resin having an epoxy ring, and examples thereof include a bisphenol A type epoxy resin, a biphenyl skeleton epoxy resin, a cyclopentadiene skeleton epoxy resin, and a naphthalene skeleton epoxy resin.

The melamine resin is not particularly limited as long as it is an organic nitrogen compound having a triazine ring at the center of the structure and three amino groups around the triazine ring, and examples thereof include alkylated melamine resins. In addition, modified products of melamine may be used.

The molar ratio of the second organic material to the first organic material (second organic material/first organic material) is preferably 0.5 to 1.5.

The cured resin obtained from the first organic material and the second organic material is obtained, for example, by reacting a hydroxyl group (OH group) of the first organic material with an isocyanate group (NCO group) of the second organic material.

When the cured resin is obtained by the above reaction, an uncured portion of the starting materials may remain in the film. For example, the dielectric resin film may contain at least one of an isocyanate group (NCO group) and a hydroxyl group (OH group). In this case, the dielectric resin film may contain any one or both of the isocyanate group and the hydroxyl group.

The presence of the isocyanate group and/or the hydroxyl group can be confirmed using a Fourier transform infrared (FT-IR) spectrophotometer.

The dielectric resin film of the present invention is preferably obtained by molding a resin solution containing the first organic material and the second organic material into a film and curing the film by heat treatment.

The dielectric resin film of the present invention thus obtained, in one aspect, has a skeleton that is more rigid than the skeleton represented by the above formula (A).

The dielectric resin film preferably contains a cured resin as a main component.

The cured resin preferably contains at least one skeleton selected from the group consisting of a biphenyl skeleton, a bisphenol acetophenone skeleton, a bisphenol fluorene skeleton, a bisphenol S skeleton, a bisphenol cyclohexanone skeleton, and an epoxy-modified bisphenol A skeleton.

In addition, the cured resin may contain a rigid skeleton such as a bisphenol BP skeleton, a bisphenol B skeleton, a bisphenol C skeleton, a bisphenol G skeleton, a bisphenol PH skeleton, a bisphenol Z skeleton, a dihydroxynaphthalene skeleton, a dihydroxyanthracene skeleton, or a reduced dihydroxyanthracene skeleton. Only one of these skeletons may be used, or two or more thereof may be used. The skeletons may be combined with the above-mentioned biphenyl skeleton, bisphenol acetophenone skeleton, bisphenol fluorene skeleton, bisphenol S skeleton, and bisphenol cyclohexanone skeleton.

When the cured resin contains these skeletons in place of the bisphenol A skeleton represented by the above formula (a), a hydrogen of a secondary carbon may be substituted with an epoxy-modified group.

Since these skeletons are as described in the first organic material, a detailed description thereof will be omitted.

The dielectric resin film of the present invention contains, in another aspect, at least one skeleton selected from the group consisting of a biphenyl skeleton, a bisphenol acetophenone skeleton, a bisphenol fluorene skeleton, a bisphenol S skeleton, a bisphenol cyclohexanone skeleton, and an epoxy-modified bisphenol A skeleton.

The skeleton such as the biphenyl skeleton contained in the dielectric resin film or the cured resin can be detected by gas chromatography-mass spectrometry (GC-MS).

The dielectric resin film of the present invention has a glass transition temperature $Tg_{film}$ of preferably 188° C. or higher, and preferably 400° C. or lower.

The glass transition temperature $Tg_{film}$ of the dielectric resin film is measured with a DSC device. The measurement is performed at a rate of temperature increase of 5° C./min, and a peak top temperature obtained by the time derivative of heat absorption and heat generation temperatures is determined as the glass transition temperature $Tg_{film}$.

The dielectric resin film of the present invention preferably has a loss coefficient of 0% to 1% at 125° C. and 100 Hz.

The dielectric resin film of the present invention preferably has a loss coefficient of 0% to 1% at 150° C. and 100 Hz.

The dielectric resin film of the present invention preferably has a loss coefficient of 0% to 3%, and more preferably 1% or less at 175° C. and 100 Hz.

The dielectric resin film of the present invention preferably has a loss coefficient of 0% to 5% at 200° C. and 100 Hz.

The loss coefficient of the dielectric resin film is a dielectric loss tangent (tan δ) of an evaluation sample measured at each temperature under the conditions of a measurement frequency of 100 Hz and a measurement voltage of 1 V using an LCR meter. The evaluation sample is obtained by forming an Al electrode having a thickness of 20 nm on each of both surfaces of the film.

The dielectric resin film of the present invention has a loss coefficient variation rate of preferably 0% or less, and more preferably −8% or less at 100 Hz from 125° C. to 150° C. Meanwhile, the dielectric resin film of the present invention has a loss coefficient variation rate of preferably −100% or more, and more preferably −50% or more at 100 Hz from 125° C. to 150° C.

The dielectric resin film of the present invention has a loss coefficient variation rate of preferably +100% or less, more preferably +40% or less, and still more preferably 0% or less at 100 Hz from 125° C. to 175° C.

Meanwhile, the dielectric resin film of the present invention has a loss coefficient variation rate of preferably −100% or more, and more preferably −50% or more at 100 Hz from 125° C. to 175° C.

The dielectric resin film of the present invention has a loss coefficient variation rate of preferably +1100% or less, more preferably +500% or less, and more preferably +350% or less at 100 Hz from 125° C. to 200° C. Meanwhile, the dielectric resin film of the present invention preferably has a loss coefficient variation rate of 0% or more at 100 Hz from 125° C. to 200° C.

An uncured portion of the starting materials may remain in the dielectric resin film of the present invention. For example, the dielectric resin film may contain at least one of an isocyanate group (NCO group) and a hydroxyl group (OH group). In this case, the dielectric resin film may contain any one or both of the isocyanate group and the hydroxyl group.

The presence of the isocyanate group and/or the hydroxyl group can be confirmed using a Fourier transform infrared (FT-IR) spectrophotometer.

The dielectric resin film of the present invention may contain a vapor-deposited polymer film as a main component. The vapor-deposited polymer film is basically contained in the cured resin.

The dielectric resin film of the present invention may contain an additive that provides another function. For example, the addition of a leveling agent can provide smoothness. More preferably, the additive is a material that has a functional group which reacts with a hydroxyl group and/or an isocyanate group and that forms a part of the crosslinked structure of a cured product. Examples of such a material include a resin having at least one functional group selected from the group consisting of an epoxy group, a silanol group, and a carboxyl group.

The thickness of the dielectric resin film of the present invention is not particularly limited, but if the film is too thin, it is likely to be brittle. Meanwhile, if the film is too thick, defects such as cracks are likely to occur during film formation. Therefore, the thickness of the dielectric resin film is preferably 1 μm to 10 μm.

The thickness of the film means the thickness of the film alone, excluding the thickness of the metal layer. The thickness of the film can be measured using an optical film thickness meter.

EXAMPLES

Hereinafter, Examples that more specifically disclose the present invention are described. The present invention is not limited to only these Examples.

[Preparation of Samples]

Comparative Example 1

A bisphenol A type phenoxy resin having a bisphenol A skeleton represented by the above formula (a) was used as a first organic material (base compound). The Tg of the material is 87° C. Diphenylmethane diisocyanate (MDI) was used as a second organic material (curing agent). The phenoxy resin was dissolved in a methyl ethyl ketone solvent and was mixed with the isocyanate curing agent to prepare a resin coating material using methyl ethyl ketone as a diluting solvent. The prepared coating material was formed into a film so as to have a thickness of 3 μm on a PET film by a doctor blade method using a film molding machine. The film molding machine heated and conveyed the PET film at a drying temperature of 60° C. The film was heat-treated for thermal curing in a hot air oven at 150° C. for 4 hours. The composition was prepared such that the base compound and the curing agent totally reacted in equal amounts.

Example 1

In Example 1, a phenoxy resin obtained by copolymerizing a biphenyl type epoxy resin and a bisphenol acetophenone type epoxy resin was used as a first organic material (base compound). An isocyanate compound was used as a second organic material (curing agent). In the present composition, a thermosetting film was prepared with the blending ratio of the base compound component to the curing agent component changed. A bisphenol A type phenoxy resin was added to the biphenyl-bisphenol acetophenone copolymerized phenoxy resin as the base compound to change the concentrations of a biphenyl skeleton and an acetophenone skeleton, thereby preparing a thermosetting film. Values of dielectric loss tangents (tan δ) of the prepared film at 125° C., 150° C., 175° C., and 200° C. were measured, and the variation rate of tan δ from 125° C. to each temperature was calculated.

Examples 1-1 to 1-6

As a first organic material (base compound), a phenoxy resin was used, which was obtained by copolymerizing a biphenyl type epoxy resin having a biphenyl skeleton represented by the above formula (1) and a bisphenol acetophenone type epoxy resin having a bisphenol acetophenone skeleton represented by the above formula (2) at a ratio of 1:1. The Tg of the material is 105° C. Diphenylmethane diisocyanate (MDI) or toluene diisocyanate (TDI) was used as a second organic material (curing agent). The phenoxy resin was dissolved in a methyl ethyl ketone solvent and was mixed with the isocyanate curing agent to prepare a resin coating material using methyl ethyl ketone as a diluting solvent. The prepared coating material was formed into a film so as to have a thickness of 3 μm on a PET film by a doctor blade method using a film molding machine. The film molding machine heated and conveyed the PET film at a drying temperature of 60° C. The film was heat-treated for thermal curing in a hot air oven at 180° C. for 4 hours.

As shown in Table 1, three compositions with the ratio of the curing agent changed were prepared: the molar ratios of the base compound and the curing agent were equal; the amount of the curing agent was half of the equal amount; and the amount of the curing agent was 1.5 times the equal amount.

Examples 1-7 to 1-9

As shown in Table 2, a bisphenol A type phenoxy resin was added to the first organic material (base compound) to prepare a film in which the concentrations of a biphenyl skeleton and a bisphenol acetophenone skeleton after curing were reduced. Three films were prepared such that the molar ratios of the biphenyl-bisphenol acetophenone copolymerized phenoxy resin to the bisphenol A type phenoxy resin were 66/33, 50/50, and 25/75. The substantial molar ratios of biphenyl skeleton/bisphenol acetophenone skeleton/bisphenol A skeleton of the compositions are 33/33/33, 25/25/50, and 12.5/12.5/75. The films were prepared such that the molar ratios of the base compound and the curing agent were equal.

[Measurement of Glass Transition Temperature $Tg_{film}$]

The $Tg_{film}$ of some of the prepared films was measured with a DSC device. The measurement was performed at a rate of temperature increase of 5° C./min, and a peak top temperature obtained by the time derivative of heat absorption and heat generation temperatures was determined.

[Measurement of Loss Coefficient]

Al electrodes were formed so as to have a thickness of 20 nm on both surfaces of the prepared film using a vacuum vapor deposition machine. A dielectric loss tangent (tan δ) value at each temperature of the evaluation sample including the Al electrodes was measured under the conditions of a measurement frequency of 100 Hz and a measurement voltage of 1 V using an LCR meter (4284A: manufactured by Agilent) to determine a loss coefficient.

The values of tan δ at 125° C., 150° C., 175° C., and 200° C., the variation rate of tan δ from 125° C. to 150° C., the variation rate of tan δ from 125° C. to 175° C., and the variation rate of tan δ from 125° C. to 200° C. are shown in Tables 1 and 2. In the "determination" columns of Tables 1 and 2, samples with a variation rate of tan δ from 125° C. to 175° C. of more than 100% were represented as poor; samples with a variation rate of tan δ from 125° C. to 175° C. of more than 0% and 100% or less were represented as good; and samples with a variation rate of tan δ from 125° C. to 175° C. of 0% or less were represented as very good.

TABLE 1

| | FIRST ORGANIC MATERIAL | | SECOND ORGANIC MATERIAL | MOLAR RATIO: SECOND ORGANIC MATERIAL/ FIRST ORGANIC MATERIAL | $Tg_{film}$ | tan δ @ 125° C. [%] | tan δ @ 150° C. [%] | tan δ @ 175° C. [%] | tan δ @ 200° C. [%] | tan δ VARIATION RATE 150° C./ 125° C. [%] | tan δ VARIATION RATE 175° C./ 125° C. [%] | tan δ VARIATION RATE 200° C./ 125° C. [%] | DETERMINATION |
|---|---|---|---|---|---|---|---|---|---|---|---|---|---|
| | MATERIAL | Tg | | | | | | | | | | | |
| COMPARATIVE EXAMPLE 1 | BISPHENOL A TYPE PHENOXY RESIN | 87° C. | MDI | 1 | 175° C. | 0.218 | 0.316 | 3.347 | 6.193 | 45 | 1435 | 2741 | POOR |
| EXAMPLE 1-1 | BIPHENYL-BISPHENOL ACETOPHENONE COPOLYMERIZED PHENOXY RESIN | 105° C. | MDI | 0.5 | — | 0.301 | 0.216 | 0.55 | 3.248 | −28 | 83 | 979 | GOOD |
| EXAMPLE 1-2 | | | | 1 | 226° C. | 0.372 | 0.258 | 0.297 | 0.736 | −31 | −20 | 98 | VERY GOOD |
| EXAMPLE 1-3 | | | | 1.5 | — | 0.484 | 0.319 | 0.323 | 0.488 | −34 | −33 | 1 | VERY GOOD |
| EXAMPLE 1-4 | | | TDI | 0.5 | — | 0.665 | 0.613 | 0.688 | 0.902 | −8 | 3 | 36 | GOOD |
| EXAMPLE 1-5 | | | | 1 | — | 0.714 | 0.68 | 0.781 | 4.094 | −5 | 9 | 473 | GOOD |
| EXAMPLE 1-6 | | | | 1.5 | — | 0.68 | 0.653 | 0.799 | 3.541 | −4 | 18 | 421 | GOOD |

TABLE 2

| | FIRST ORGANIC MATERIAL | | SECOND ORGANIC MATERIAL | MOLAR RATIO: SECOND ORGANIC MATERIAL/ FIRST ORGANIC MATERIAL | $Tg_{film}$ | tan δ @ 125° C. [%] | tan δ @ 150° C. [%] | tan δ @ 175° C. [%] | tan δ @ 200° C. [%] | tan δ VARIATION RATE 150° C./ 125° C. [%] | tan δ VARIATION RATE 175° C./ 125° C. [%] | tan δ VARIATION RATE 200° C./ 125° C. [%] | DETERMINATION |
|---|---|---|---|---|---|---|---|---|---|---|---|---|---|
| | MATERIAL | MOLAR RATIO (1)/(2) | | | | | | | | | | | |
| EXAMPLE 1-7 | (1) BIPHENYL-BISPHENOL ACETOPHENONE COPOLYMERIZED PHENOXY RESIN (2) BISPHENOL A TYPE PHENOXY RESIN | 66/33 | MDI | 1 | — | 0.809 | 0.725 | 0.707 | 1.711 | −10 | −13 | 111 | VERY GOOD |
| EXAMPLE 1-8 | | 50/50 | | | — | 0.533 | 0.448 | 0.461 | 1.729 | −16 | −14 | 224 | VERY GOOD |
| EXAMPLE 1-9 | | 25/75 | | | 188° C. | 0.382 | 0.377 | 0.62 | 4.396 | −1 | 62 | 1051 | GOOD |

As shown in Table 1, the variation rate of tan δ was suppressed in all the compositions of Examples 1-1 to 1-3 containing the biphenyl-bisphenol acetophenone copolymerized phenoxy resin as the first organic material (base compound) as compared with the composition of Comparative Example 1 containing a conventional bisphenol A type phenoxy resin. In particular, the variation rate of tan δ from 125° C. to 175 was 1435% in Comparative Example, whereas the variation rate was 83% at the most in Examples, which was significantly suppressed.

In Examples 1-4 to 1-6, when the second organic material was changed to TDI, the variation rate of tan δ at a temperature higher than 125° C. was suppressed.

As shown in Table 2, in Examples 1-7 to 1-9, the variation rate of tan δ was suppressed when the contents of the biphenyl skeleton and the bisphenol acetophenone skeleton in the film were low. In particular, in Example 1-9, the variation rate of tan δ was suppressed by merely adding 25 mol % of the biphenyl-bisphenol acetophenone copolymerized phenoxy resin to the bisphenol A type phenoxy resin.

[Method for Detecting Biphenyl Skeleton]

The inclusion of the biphenyl skeleton in the final cured film can be detected by GC-MS. The measurement procedure and the results will be shown below.

Figure 2:
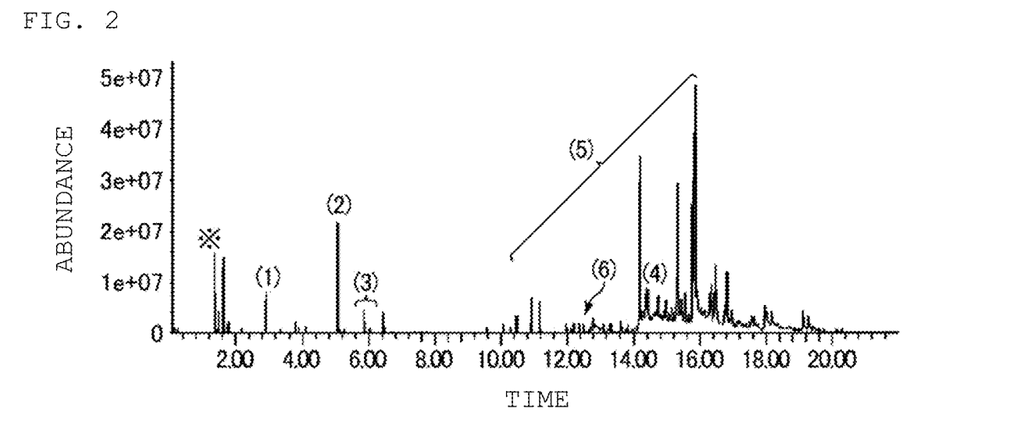
FIG. 2 shows a chromatogram as the measurement result of Example 1-2.
Figure 3A:
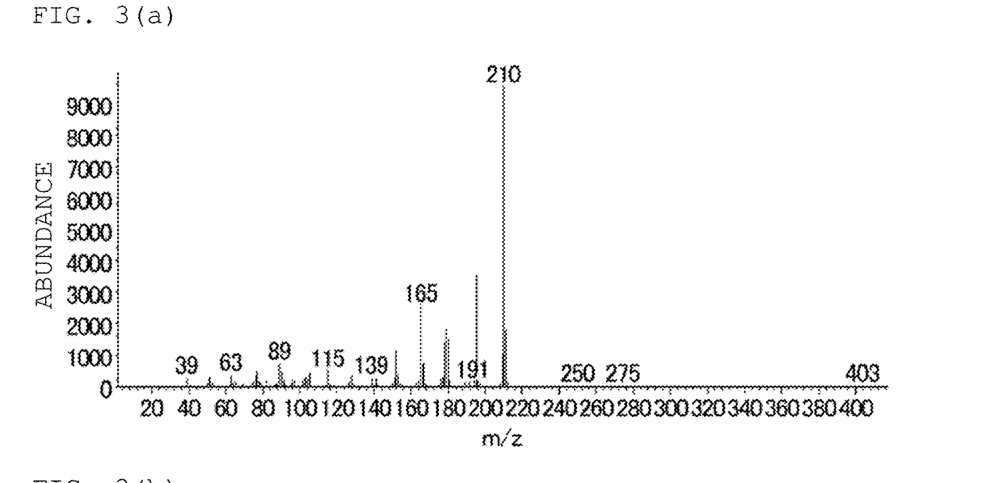
FIG. 3(a) shows the results of measuring a separated material designated by numeral 6 in FIG. 2 in an MS spectrum.
Figure 3B:
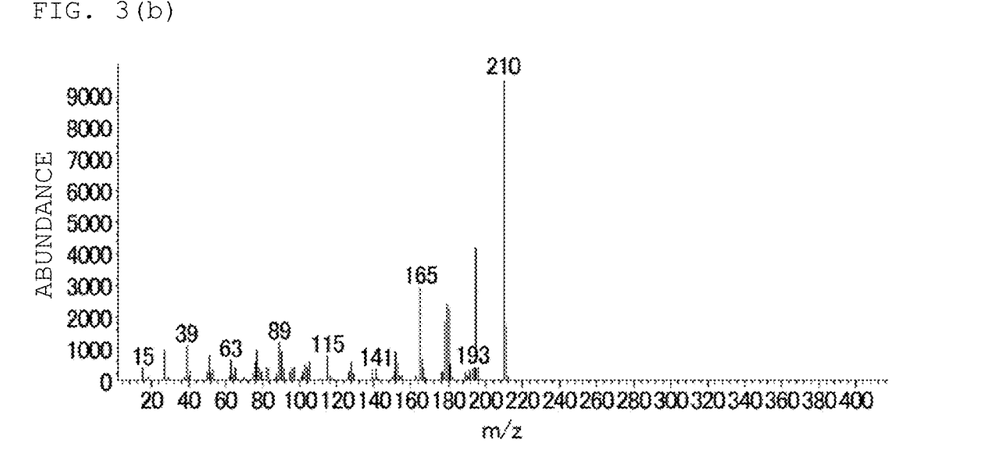
FIG. 3(b) shows a standard MS spectrum of tetramethylbiphenyl.

Among the prepared samples, the composition of biphenyl-bisphenol acetophenone copolymerized phenoxy resin/MDI in equal amounts (Example 1-2) was subjected to GC-MS measurement. First, the prepared film was heated at 500° C. Gas generated during heating was separated on a chromatogram. The chromatogram as the measurement result of Example 1-2 is shown in FIG. 2. FIG. 3(*a*) shows the results of measuring a separated material designated by numeral 6 in FIG. 2 in an MS spectrum, and FIG. 3(*b*) shows a standard MS spectrum of tetramethylbiphenyl. From FIGS. 3(a) and 3(b), a standard MS spectrum corresponding to tetramethylbiphenyl was detected. As described above, the inclusion of the biphenyl skeleton in the structure can be confirmed by GC-MS.

Similarly, the inclusion of the biphenyl skeleton in the other compositions can be confirmed by GC-MS.

Example 2

In Example 2, a phenoxy resin obtained by copolymerizing a bisphenol A type epoxy resin and a bisphenol fluorene type epoxy resin was used as a first organic material (base compound). An isocyanate compound was used as a second organic material (curing agent) as with Example 1.

In the present composition, a thermosetting film was prepared with the blending ratio of the base compound component to the curing agent component changed. A bisphenol A type phenoxy resin was added to the bisphenol A-bisphenol fluorene copolymerized phenoxy resin as the base compound to change the concentration of a bisphenol fluorene skeleton, thereby preparing a thermosetting film. The values of tan δ of the prepared film at 125° C., 150° C., 175° C., and 200° C. were measured, and the variation rate of tan δ from 125° C. to each temperature was calculated.

Examples 2-1 to 2-6

As a first organic material (base compound), a phenoxy resin was used, which was obtained by copolymerizing a bisphenol A type epoxy resin having a bisphenol A skeleton represented by the above formula (a) and a bisphenol fluorene type epoxy resin having a bisphenol fluorene skeleton represented by the above formula (3) at a ratio of 1:1. The Tg of the material is 150° C. Diphenylmethane diisocyanate (MDI) or toluene diisocyanate (TDI) was used as a second organic material (curing agent). The phenoxy resin was dissolved in a methyl ethyl ketone solvent and was mixed with the isocyanate curing agent to prepare a resin coating material using methyl ethyl ketone as a diluting solvent. The prepared coating material was formed into a film so as to have a thickness of 3 μm on a PET film by a doctor blade method using a film molding machine. The film molding machine heated and conveyed the PET film at a drying temperature of 60° C. The film was heat-treated for thermal curing in a hot air oven at 180° C. for 4 hours.

As shown in Table 3, three compositions with the ratio of the curing agent changed were prepared: the molar ratios of the base compound and the curing agent were equal; the amount of the curing agent was half of the equal amount; and the amount of the curing agent was 1.5 times the equal amount.

Examples 2-7 to 2-9

As shown in Table 4, a bisphenol A type phenoxy resin was added to the first organic material (base compound) to prepare a film in which the concentration of a bisphenol fluorene skeleton after curing was reduced. Three films were prepared such that the molar ratios of the bisphenol A-bisphenol fluorene copolymerized phenoxy resin to the bisphenol A type phenoxy resin were 66/33, 50/50, and 25/75. Since the bisphenol A skeleton contained in the bisphenol A-bisphenol fluorene copolymerized phenoxy resin itself is half of the bisphenol A-bisphenol fluorene copolymerized phenoxy resin, the substantial molar ratios of bisphenol fluorene skeleton/bisphenol A skeleton in the compositions are 33/66, 25/75, and 12.5/87.5. The films were prepared such that the molar ratios of the base compound and the curing agent were equal.

The glass transition temperature $Tg_{film}$ and the loss coefficient of the prepared films were measured in the same manner in Example 1.

The values of tan δ at 125° C., 150° C., 175° C., and 200° C., the variation rate of tan δ from 125° C. to 150° C., the variation rate of tan δ from 125° C. to 175° C., and the variation rate of tan δ from 125° C. to 200° C. are shown in Tables 3 and 4. In the "determination" columns of Tables 3 and 4, samples with a variation rate of tan δ from 125° C. to 175° C. of more than 100% were represented as poor; samples with a variation rate of tan δ from 125° C. to 175° C. of more than 0% and 100% or less were represented as good; and samples with a variation rate of tan δ from 125° C. to 175° C. of 0% or less were represented as very good.

TABLE 3

| | FIRST ORGANIC MATERIAL | Tg | SECOND ORGANIC MATERIAL | MOLAR RATIO: SECOND ORGANIC MATERIAL/ FIRST ORGANIC MATERIAL | $Tg_{film}$ | tan δ @ 125° C. [%] | tan δ @ 150° C. [%] | tan δ @ 175° C. [%] | tan δ @ 200° C. [%] | tan δ VARIATION RATE 150° C./ 125° C. [%] | tan δ VARIATION RATE 175° C./ 125° C. [%] | tan δ VARIATION RATE 200° C./ 125° C. [%] | DETERMINATION |
|---|---|---|---|---|---|---|---|---|---|---|---|---|---|
| COMPARATIVE EXAMPLE 1 | BISPHENOL A TYPE PHENOXY RESIN | 87° C. | MDI | 1 | 175° C. | 0.218 | 0.316 | 3.347 | 6.193 | 45 | 1435 | 2741 | POOR |
| EXAMPLE 2-1 | BISPHENOL A- BISPHENOL FLUORENE COPOLYMERIZED PHENOXY RESIN | 150° C. | MDI | 0.5 | — | 0.317 | 0.292 | 0.283 | 1.397 | −8 | −11 | 341 | VERY GOOD |
| EXAMPLE 2-2 | | | | 1 | 228° C. | 0.401 | 0.364 | 0.367 | 0.47 | −9 | −8 | 17 | VERY GOOD |
| EXAMPLE 2-3 | | | | 1.5 | — | 0.346 | 0.301 | 0.307 | 0.377 | −13 | −11 | 9 | VERY GOOD |
| EXAMPLE 2-4 | | | TDI | 0.5 | — | 0.581 | 0.528 | 0.631 | 3.013 | −9 | 9 | 419 | GOOD |
| EXAMPLE 2-5 | | | | 1 | — | 0.518 | 0.443 | 0.456 | 1.625 | −14 | −12 | 214 | VERY GOOD |
| EXAMPLE 2-6 | | | | 1.5 | — | 0.635 | 0.582 | 0.626 | 1.672 | −8 | −1 | 163 | VERY GOOD |

TABLE 4

| | FIRST ORGANIC MATERIAL | | MOLAR RATIO (1)/(2) | SECOND ORGANIC MATERIAL | MOLAR RATIO: SECOND ORGANIC MATERIAL/ FIRST ORGANIC MATERIAL | tan δ @ 125° C. [%] | tan δ @ 150° C. [%] | tan δ @ 175° C. [%] | tan δ @ 200° C. [%] | tan δ VARIATION RATE 150° C./ 125° C. [%] | tan δ VARIATION RATE 175° C./ 125° C. [%] | tan δ VARIATION RATE 200° C./ 125° C. [%] | DETERMINATION |
|---|---|---|---|---|---|---|---|---|---|---|---|---|---|
| | MATERIAL | | | | | | | | | | | | |
| EXAMPLE 2-7 | (1) BISPHENOL A-BISPHENOL FLUORENE COPOLYMERIZED PHENOXY RESIN | | 66/33 | MDI | 1 | 0.309 | 0.255 | 0.264 | 0.442 | −17 | −15 | 43 | VERY GOOD |
| EXAMPLE 2-8 | | | 50/50 | | | 0.313 | 0.266 | 0.278 | 0.675 | −15 | −11 | 116 | VERY GOOD |
| EXAMPLE 2-9 | | | 25/75 | | | 0.336 | 0.307 | 0.383 | 1.946 | −9 | 14 | 479 | GOOD |
| | (2) BISPHENOL A TYPE PHENOXY RESIN | | | | | | | | | | | | |

As shown in Table 3, the variation rate of tan δ was suppressed in all the compositions of Examples 2-1 to 2-6 containing the bisphenol A-bisphenol fluorene copolymerized phenoxy resin as the first organic material (base compound) as compared with the composition of Comparative Example 1 containing a conventional bisphenol A type phenoxy resin. As described above, the same effects as those in Example 1 could be confirmed to be obtained by using the bisphenol A-bisphenol fluorene copolymerized phenoxy resin as the first organic material (base compound).

As shown in Table 4, in Examples 2-7 to 2-9, the variation rate of tan δ was suppressed when the content of the bisphenol fluorene skeleton in the film was small. In particular, in Example 2-9, the variation rate of tan δ was suppressed by merely adding 25 mol % of the bisphenol A-bisphenol fluorene copolymerized phenoxy resin to the bisphenol A type phenoxy resin.

[Method for Detecting Fluorene Skeleton]

The inclusion of the fluorene skeleton in the final cured film can be detected by GC-MS. The measurement procedure and the results will be shown below.

Figure 4:
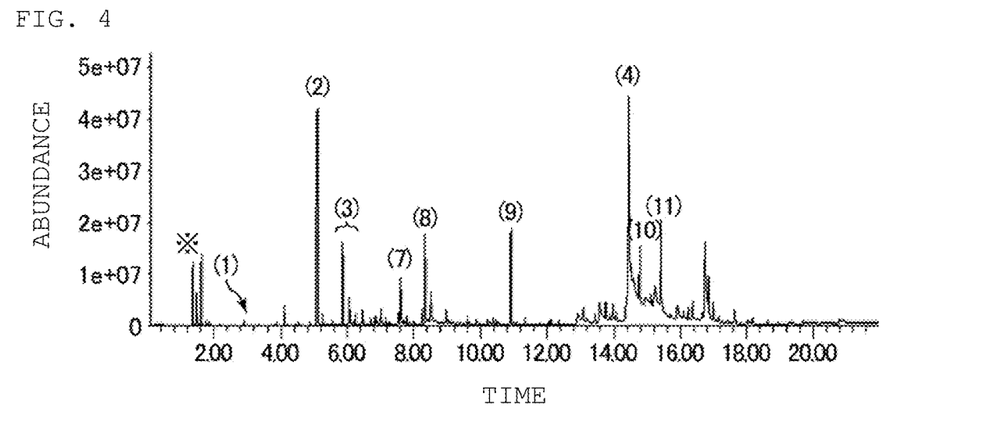
FIG. 4 shows a chromatogram as the measurement result of Example 2-2.
Figure 5A:
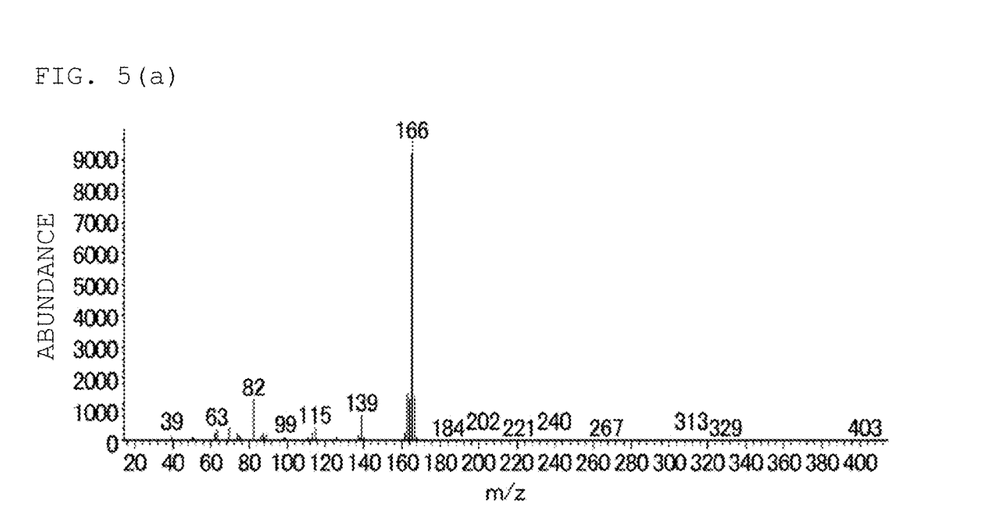
FIG. 5(a) shows the results of measuring a separated material designated by numeral 9 in FIG. 4 in an MS spectrum.
Figure 5B:
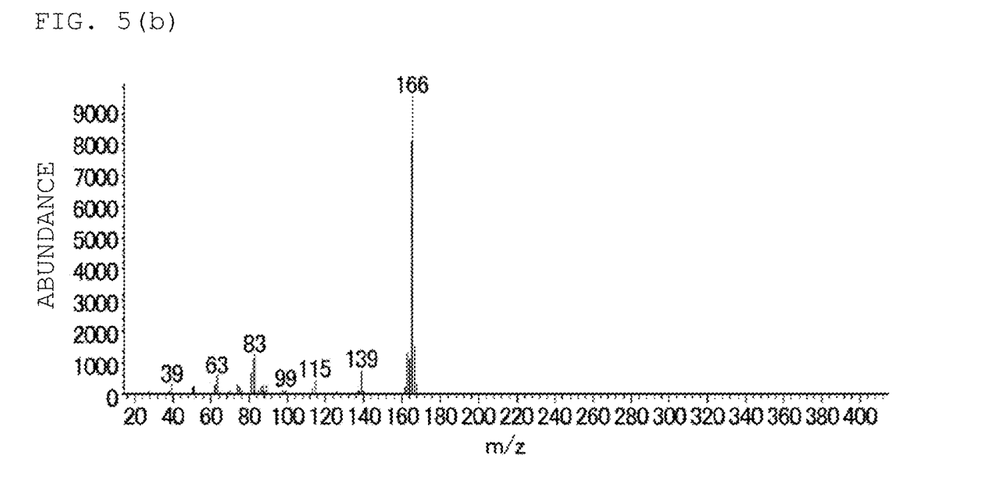
FIG. 5(b) shows a standard MS spectrum of fluorene.
Figure 6A:
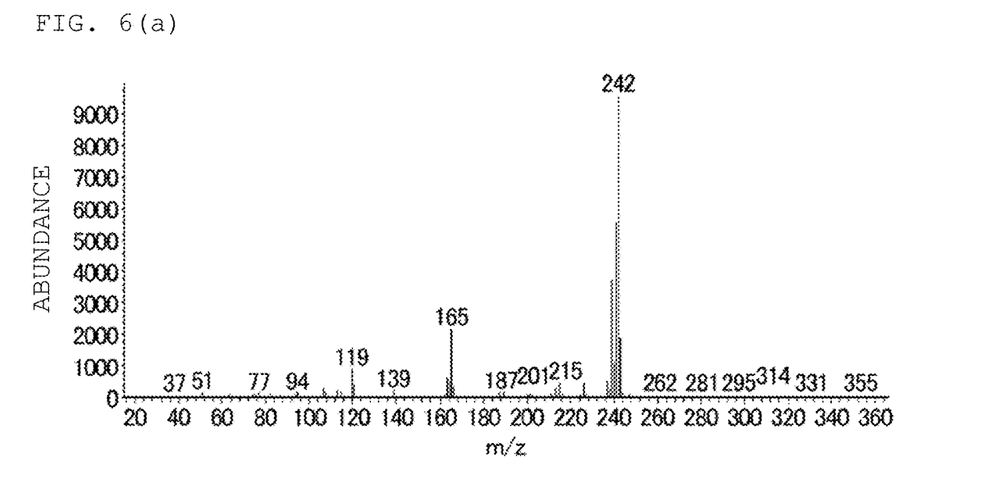
FIG. 6(a) shows the results of measuring a separated material designated by numeral 10 in FIG. 4 in an MS spectrum.
Figure 6B:
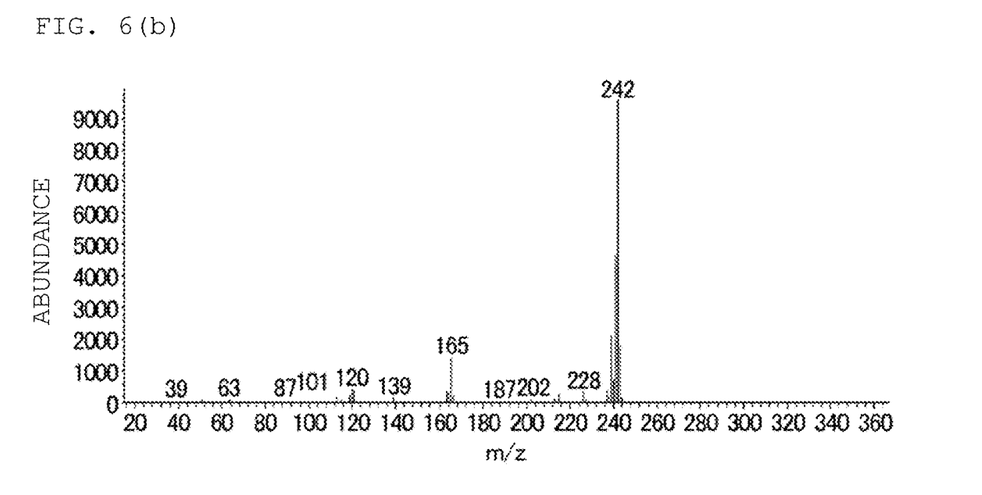
FIG. 6(b) shows a standard MS spectrum of phenylfluorene.

Among the prepared samples, the composition of bisphenol A-bisphenol fluorene copolymerized phenoxy resin/MDI in equal amounts (Example 2-2) was subjected to GC-MS measurement. First, the prepared film was heated at 500° C. in the same manner as in Example 1. Gas generated during heating was separated on a chromatogram. The chromatogram as the measurement result of Example 2-2 is shown in FIG. 4. FIG. 5(a) shows the results of measuring a separated material designated by numeral 9 in FIG. 4 in an MS spectrum, and FIG. 5(b) shows a standard MS spectrum of fluorene. FIG. 6(a) shows the results of measuring a separated material designated by numeral 10 in FIG. 4 in an MS spectrum, and FIG. 6(b) shows a standard MS spectrum of phenylfluorene. From FIGS. 5(a), 5(b), 6(a), and 6(b), standard MS spectra corresponding to fluorene and phenylfluorene were detected. As described above, the inclusion of the fluorene skeleton in the structure can be confirmed by GC-MS.

Example 3

In Example 3, a phenoxy resin other than the phenoxy resin used in Examples 1 and 2 was used. The values of tan δ of the prepared film at 125° C., 150° C., 175° C., and 200° C. were measured, and the variation rate of tan δ from 125° C. to each temperature was calculated.

Examples 3-1 to 3-5

As a first organic material (base compound), a phenoxy resin having a higher Tg than that of a bisphenol A type phenoxy resin (Tg=87° C.) was used. Table 5 shows the names and Tg of the phenoxy resins used. Diphenylmethane diisocyanate (MDI) was used as a second organic material (curing agent). The phenoxy resin was dissolved in a methyl ethyl ketone solvent and was mixed with the isocyanate curing agent to prepare a resin coating material containing methyl ethyl ketone as a diluting solvent. The prepared coating material was formed into a film so as to have a thickness of 3 μm on a PET film by a doctor blade method using a film molding machine. The film molding machine heated and conveyed the PET film at a drying temperature of 60° C. The film was heat-treated for thermal curing in a hot air oven at 180° C. for 4 hours. The composition was prepared such that the base compound and the curing agent totally reacted in equal amounts.

The first organic materials shown in Table 5 are a total of five phenoxy resins: a phenoxy resin obtained by copolymerizing a bisphenol S type epoxy resin having a bisphenol S skeleton represented by the above formula (4) and a bisphenol A type epoxy resin having a bisphenol A skeleton represented by the above formula (a); a phenoxy resin obtained by copolymerizing a bisphenol A type epoxy resin having a bisphenol A skeleton represented by the above formula (a) and a bisphenol tetramethylcyclohexanone (TMC) type epoxy resin having a bisphenol cyclohexanone skeleton represented by the above formula (5); a phenoxy resin obtained by copolymerizing a biphenyl type epoxy resin having a biphenyl skeleton represented by the above formula (1) and a bisphenol TMC type epoxy resin having a bisphenol cyclohexanone skeleton represented by the above formula (5); a phenoxy resin obtained by copolymerizing a biphenyl type epoxy resin having a biphenyl skeleton represented by the above formula (1) and a bisphenol fluorene type epoxy resin having a bisphenol fluorene skeleton represented by the above formula (3); and a phenoxy resin obtained by copolymerizing an epoxy-modified bisphenol A type epoxy resin having an epoxy-modified bisphenol A skeleton represented by the above formula (6) and a bisphenol A type epoxy resin having a bisphenol A skeleton represented by the above formula (a). Regarding tion rate of tan δ from 125° C. to 175° C. of more than 0% and 100% or less were represented as good; and samples with a variation rate of tan δ from 125° C. to 175° C. of 0% or less were represented as very good.

TABLE 5

| | FIRST ORGANIC MATERIAL | Tg | SECOND ORGANIC MATERIAL | MOLAR RATIO: SECOND ORGANIC MATERIAL/ FIRST ORGANIC MATERIAL | $Tg_{film}$ | tan δ @ 125° C. [%] | tan δ @ 150° C. [%] | tan δ @ 175° C. [%] | tan δ @ 200° C. [%] | tan δ VARIATION RATE 150° C./ 125° C. [%] | tan δ VARIATION RATE 175° C./ 125° C. [%] | tan δ VARIATION RATE 200° C./ 125° C. [%] | DETERMINATION |
|---|---|---|---|---|---|---|---|---|---|---|---|---|---|
| COMPARATIVE EXAMPLE 1 | BISPHENOL A TYPE PHENOXY RESIN | 87° C. | MDI | 1 | 175° C. | 0.218 | 0.316 | 3.347 | 6.193 | 45 | 1435 | 2741 | POOR |
| EXAMPLE 3-1 | BISPHENOL S-BISPHENOL A COPOLYMERIZED PHENOXY RESIN | 115° C. | MDI | 1 | 221 | 0.664 | 0.627 | 0.73 | 2.054 | −6 | 10 | 209 | GOOD |
| EXAMPLE 3-2 | BISPHENOL A-BISPHENOL TMC COPOLYMERIZED PHENOXY RESIN | 98° C. | | | 207 | 0.328 | 0.281 | 0.279 | 0.402 | −14 | −15 | 23 | VERY GOOD |
| EXAMPLE 3-3 | BIPHENYL-BISPHENOL TMC COPOLYMERIZED PHENOXY RESIN | 120° C. | | | 223 | 0.444 | 0.395 | 0.39 | 0.497 | −11 | −12 | 12 | VERY GOOD |
| EXAMPLE 3-4 | BIPHENYL-BISPHENOL FLUORENE COPOLYMERIZED PHENOXY RESIN | 160° C. | | | — | 0.39 | 0.332 | 0.319 | 0.44 | −15 | −19 | 13 | VERY GOOD |
| EXAMPLE 3-5 | EPOXY-MODIFIED BISPHENOL A-BISPHENOL A COPOLYMERIZED PHENOXY RESIN | 87° C. | | | 191 | 0.627 | 0.586 | 0.712 | 2.86 | −7 | 14 | 356 | GOOD | the phenoxy resin obtained by copolymerizing the bisphenol S type epoxy resin and the bisphenol A type epoxy resin, the copolymerization ratio of the bisphenol S to the bisphenol A is 35/65 in terms of the monomer ratio. Regarding the other phenoxy resins, all the polymerization ratios are 50/50.

The glass transition temperature $Tg_{film}$ and the loss coefficient of the prepared films were measured in the same manner in Example 1.

The values of tan δ at 125° C., 150° C., 175° C., and 200° C., the variation rate of tan δ from 125° C. to 150° C., the variation rate of tan δ from 125° C. to 175° C., and the variation rate of tan δ from 125° C. to 200° C. are shown in Table 5. In the "determination" columns of Table 5, samples with a variation rate of tan δ from 125° C. to 175° C. of more than 100% were represented as poor; samples with a varia- As with Examples 1 and 2, in Examples 3-1 to 3-5, the variation rate of tan δ was suppressed as compared with the composition of Comparative Example 1 containing a conventional bisphenol A type phenoxy resin.

From the results of Examples 1 to 3, it is believed that the variation rate of tan δ can be suppressed by using the first organic material (base compound) having a higher Tg than that of the bisphenol A type phenoxy resin and the film having a higher $Tg_{film}$ than that of the film of Comparative Example 1.

[Method for Detecting Bisphenol S Skeleton]

Also in Example 3, the inclusion of the rigid skeleton in the cured film can be detected by GC-MS. As a typical example, a method for separating the bisphenol S skeleton and the results will be shown below.

Figure 7:
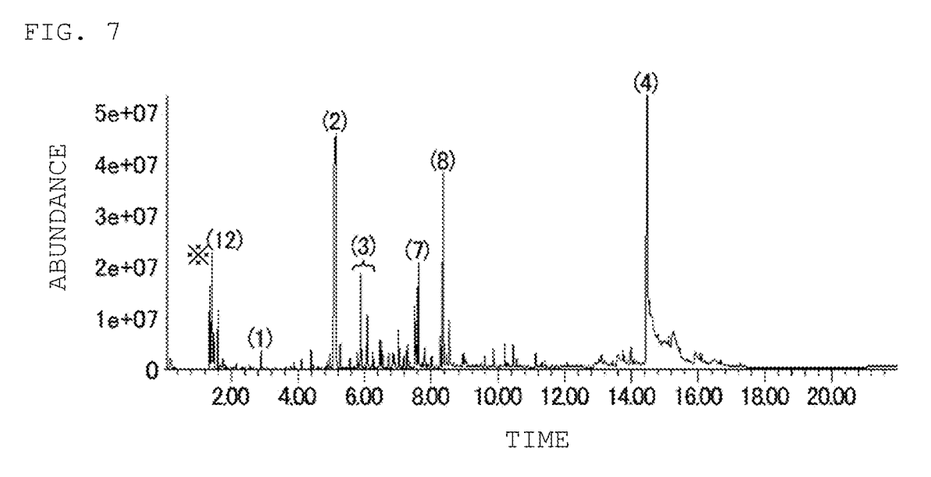
FIG. 7 shows a chromatogram as the measurement result of Example 3-1.
Figure 8A:
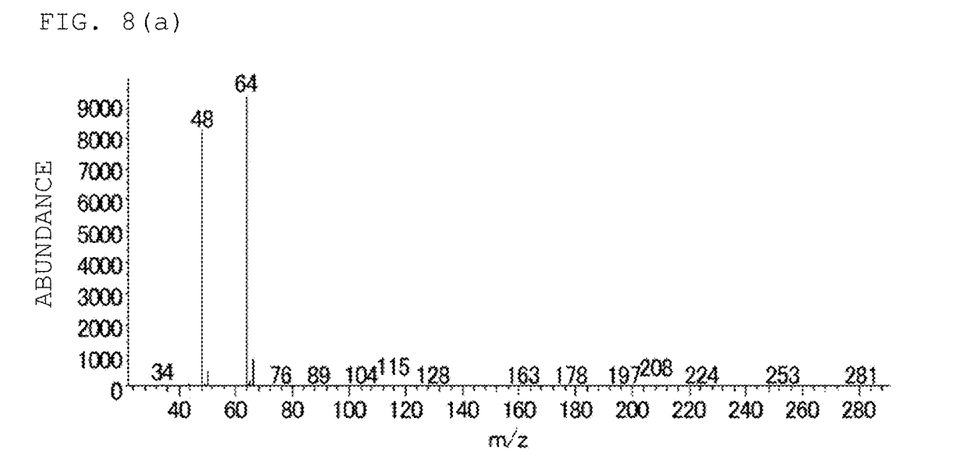
FIG. 8(a) shows the results of measuring a separated material designated by numeral 12 in FIG. 7 in an MS spectrum.
Figure 8B:
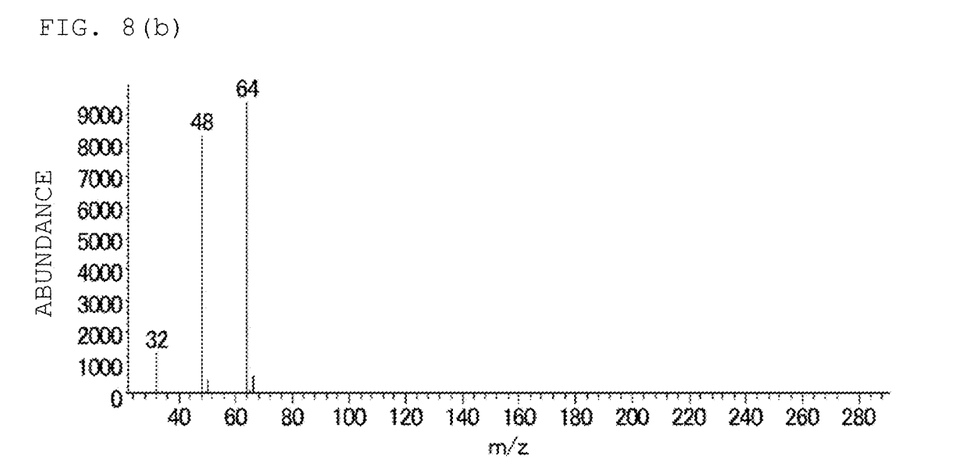
FIG. 8(b) shows a standard MS spectrum of sulfur dioxide.

Among the prepared samples, the composition of bisphenol S-bisphenol A copolymerized phenoxy resin/MDI in equal amounts (Example 3-1) was subjected to GC-MS measurement. First, the prepared film was heated at 500° C. in the same manner as in Examples 1 and 2. Gas generated during heating was separated on a chromatogram. The chromatogram as the measurement result of Example 3-1 is shown in FIG. 7. FIG. 8(*a*) shows the results of measuring a separated material designated by numeral 12 in FIG. 7 in an MS spectrum, and FIG. 8(*b*) shows a standard MS spectrum of sulfur dioxide. From FIGS. 8(*a*) and 8(*b*), a standard MS spectrum corresponding to sulfur dioxide was detected. As described above, the inclusion of the bisphenol S skeleton in the structure can be confirmed by GC-MS.

DESCRIPTION OF REFERENCE SYMBOLS

1: Film capacitor
11: First dielectric resin film
12: Second dielectric resin film
21: First counter electrode (first metal layer)
22: Second counter electrode (second metal layer)
31: First external terminal electrode
32: Second external terminal electrode

The invention claimed is:

1. A film capacitor comprising:
a dielectric resin film; and
a metal layer on at least one surface of the dielectric resin film,
wherein the dielectric resin film contains at least one skeleton selected from the group consisting of a biphenyl skeleton, a bisphenol acetophenone skeleton, a bisphenol fluorene skeleton, a bisphenol S skeleton, and a bisphenol cyclohexanone skeleton.

2. The film capacitor according to claim 1, wherein the dielectric resin film has a glass transition temperature $Tg_{film}$ of 188° C. or higher.

3. The film capacitor according to claim 2, wherein the glass transition temperature $Tg_{film}$ is 188° C. to 400° C.

4. The film capacitor according to claim 1, wherein the dielectric resin film has a loss coefficient of 0% to 3% at 175° C. and 100 Hz.

5. The film capacitor according to claim 4, wherein the loss coefficient is 1% to 3% at 175° C. and 100 Hz.

6. The film capacitor according to claim 4, wherein the loss coefficient is 0% to 1% at 150° C. and 100 Hz.

7. The film capacitor according to claim 4, wherein the loss coefficient is 0% to 1% at 125° C. and 100 Hz.

8. The film capacitor according to claim 4, wherein the loss coefficient is 0% to 5% at 200° C. and 100 Hz.

9. The film capacitor according to claim 1, wherein the dielectric resin film has a loss coefficient variation rate of +100% or less at 100 Hz from 125° C. to 175° C.

10. The film capacitor according to claim 9, wherein the loss coefficient variation rate is +40% or less at 100 Hz from 125° C. to 175° C.

11. The film capacitor according to claim 9, wherein the loss coefficient variation rate is 0% or less at 100 Hz from 125° C. to 175° C.

12. The film capacitor according to claim 9, wherein the loss coefficient variation rate is −100% to +100% at 100 Hz from 125° C. to 175° C.

13. The film capacitor according to claim 1, wherein the dielectric resin film has a loss coefficient variation rate of 0% or less at 100 Hz from 125° C. to 150° C.

14. The film capacitor according to claim 13, wherein the loss coefficient variation rate is −100% to 0% at 100 Hz from 125° C. to 150° C.

15. The film capacitor according to claim 1, wherein the dielectric resin film contains at least one of an isocyanate group and a hydroxyl group.

16. A film capacitor comprising:
a dielectric resin film; and
a metal layer on at least one surface of the dielectric resin film, wherein:
the dielectric resin film contains a cured resin obtained from a first organic material and a second organic material as a main component of the cured resin; and
the first organic material is a phenoxy resin containing a first phenoxy resin having a glass transition temperature Tg higher than 87° C.
wherein the first phenoxy resin contains at least one skeleton selected from the group consisting of a biphenyl skeleton, a bisphenol acetophenone skeleton, a bisphenol fluorene skeleton, a bisphenol S skeleton, and a bisphenol cyclohexanone skeleton.

17. The film capacitor according to claim 16, wherein the glass transition temperature Tg is 90° C. or higher.

18. The film capacitor according to claim 16, wherein the first phenoxy resin has a glass transition temperature Tg of higher than 87° C. and 200° C. or lower.

19. The film capacitor according to claim 16, wherein the first phenoxy resin is any one phenoxy resin selected from the group consisting of a biphenyl-bisphenol acetophenone copolymerized phenoxy resin, a bisphenol A-bisphenol fluorene copolymerized phenoxy resin, a bisphenol S-bisphenol A copolymerized phenoxy resin, a bisphenol A-bisphenol TMC copolymerized phenoxy resin, a biphenyl-bisphenol TMC copolymerized phenoxy resin, and a biphenyl-bisphenol fluorene copolymerized phenoxy resin.

20. The film capacitor according to claim 16, wherein the first organic material contains 12.5 mol % or more of the first phenoxy resin with respect to the dielectric resin film.

21. The film capacitor according to claim 16, wherein the second organic material is an isocyanate compound.

22. The film capacitor according to claim 21, wherein the isocyanate compound is any one of diphenylmethane diisocyanate and tolylene diisocyanate.

23. The film capacitor according to claim 16, wherein a molar ratio of the second organic material to the first organic material is 0.5 to 1.5.

24. A dielectric resin film for film capacitors, the dielectric resin film comprising at least one skeleton selected from the group consisting of a biphenyl skeleton, a bisphenol acetophenone skeleton, a bisphenol fluorene skeleton, a bisphenol S skeleton, and a bisphenol cyclohexanone skeleton.

* * * * *